US006643889B1

United States Patent
Kotlarski

(10) Patent No.: US 6,643,889 B1
(45) Date of Patent: Nov. 11, 2003

(54) WIPER APPARATUS INCLUDING PIVOT LIMITING MEANS

(75) Inventor: Thomas Kotlarski, Bad Neuenahr (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 09/806,268
(22) PCT Filed: Jun. 15, 2000
(86) PCT No.: PCT/DE00/01988
§ 371 (c)(1), (2), (4) Date: Mar. 28, 2001
(87) PCT Pub. No.: WO01/08949
PCT Pub. Date: Feb. 8, 2001

(30) Foreign Application Priority Data

Jul. 30, 1999 (DE) .......................... 199 35 860

(51) Int. Cl.⁷ .................................. B60S 1/40
(52) U.S. Cl. .................................. 15/250.32
(58) Field of Search .................. 15/250.32, 250.31, 15/250.351, 250.361

(56) References Cited

U.S. PATENT DOCUMENTS

| 2,404,523 A | * | 7/1946 | Nesson ..................... 15/250.32 |
| 3,163,877 A | * | 1/1965 | Wubbe ..................... 15/250.32 |
| 3,576,044 A | * | 4/1971 | Besnard ..................... 15/250.32 |
| 4,293,974 A |   | 10/1981 | Gowans ..................... 15/250.32 |

FOREIGN PATENT DOCUMENTS

| DE | 19 95 352 A | 9/1969 |
| DE | 197 29 862 A | 1/1999 |
| DE | 197 57 872 A | 7/1999 |

* cited by examiner

*Primary Examiner*—Gary K. Graham
(74) *Attorney, Agent, or Firm*—Michael J. Striker

(57) ABSTRACT

A wiper apparatus (10) for motor vehicle windows (20) is proposed, having a wiper arm (12) that can be moved between reversal positions, is loaded toward the window (20), and whose free end is connected to an elongated wiper blade (16), which can pivot around an axis (32) pointing in the wiping direction, and together with the wiper arm (12), can be moved lateral to the wiping direction, from its operating position into an installation position. The wiper apparatus has two bearing pins (72), which are part of the pivot hinge, protrude from the longitudinal sides of the wiper blade (16), are aligned with each other, are noncircular in cross section, and are guided in recesses (54) of the wiper-arm (12) that are open at the edge, and is provided with means for limiting the pivoting motion (double arrow 34). A universal use of means for limiting the pivoting motion is achieved if the wiper blade (16) is provided with an elastically deflectable, tab-like protrusion (78), which extends at least approximately in the pivot direction (double arrow 34) and has a stop shoulder (84) disposed at its free end which, when the wiper blade is installed, engages behind a counterpart shoulder (94) on the wiper arm in such a way that the stop shoulder (84) and the counterpart shoulder (94) constitute the limitation means.

7 Claims, 2 Drawing Sheets

WIPER APPARATUS INCLUDING PIVOT LIMITING MEANS

BACKGROUND OF THE INVENTION

In wiper apparatuses of the type limiting the necessary pivoting motion lateral to the wiping direction in a particular installation position when the wiper blade is lifted up from the window along with the wiper arm, should prevent the wiper blade from moving-due to improper handling-around the pivot axis until its bearing pins automatically travel through the opening of the bearing recesses so that the wiper blade unintentionally come loose from the wiper arm, falls off, and damages the finish of the vehicle, for example.

In a known wiper apparatus of this type (DE-AS 19 05 352), the free end of the wiper arm is inserted between the spaced-apart side walls of a support frame associated with the wiper blade, in which button-like support projections pointing toward one another protrude from the inside walls that are oriented toward each other; after installation of the wiper blade on the wiper arm, these support projections can be moved in oblong holes which are provided in guide walls of the wiper arm and whose length limits the pivoting motion. In order to realize the limiting means, the solution to the problem explained at the beginning consequently requires particular design features both in the wiper blade (support frame side walls) and in the wiper arm (placement between the side walls).

SUMMARY OF THE INVENTION

In the wiper blade according to the invention the embodiment of the wiper blade and wiper arm is irrelevant because the elastic protrusion of the wiper blade, with its stop shoulder and the counterpart shoulder of the wiper arm, is not tied to any particular design features of the wiper apparatus.

A particularly inexpensive realization of the protrusion and the stop shoulder disposed on it is achieved if the pivot hinge pins are disposed on a component made of plastic that is a part of the wiper blade and if the protrusion is also of one piece with the component.

The stop shoulder is constituted simply in that it is embodied on an overhang of the protrusion which is at least approximately oriented toward the pivot axis.

Another reduction of manufacturing costs for the wiper apparatus is achieved if the counterpart shoulder of the wiper arm is disposed on a component which is disposed at the free end of the wiper arm and contains the bearing recesses that are part of the pivot hinge.

The use of the pivoting motion limitation is particularly advisable in wiper apparatuses in which starting from the pivot axis, the openings of the bearing recesses are aligned essentially parallel to the window to be wiped.

Decisive advantages with regard to the height of the wiper apparatus are also achieved by virtue of the fact that the wiper blade is disposed next to the wiper arm viewed in the direction of the pivot axis.

Other advantages with regard to the height of the wiper apparatus are achieved if the component associated with the wiper blade is disposed in the middle section of a band-like, elongated support whose one band surface has an elongated wiper element attached to it, which can be placed against the window.

Other advantageous improvements and embodiments of the invention will be disclosed in the following description of an exemplary embodiment shown in the accompanying drawings.

DESCRIPTION OF THE PREFERRED EMBODIMENT

Figure 1:
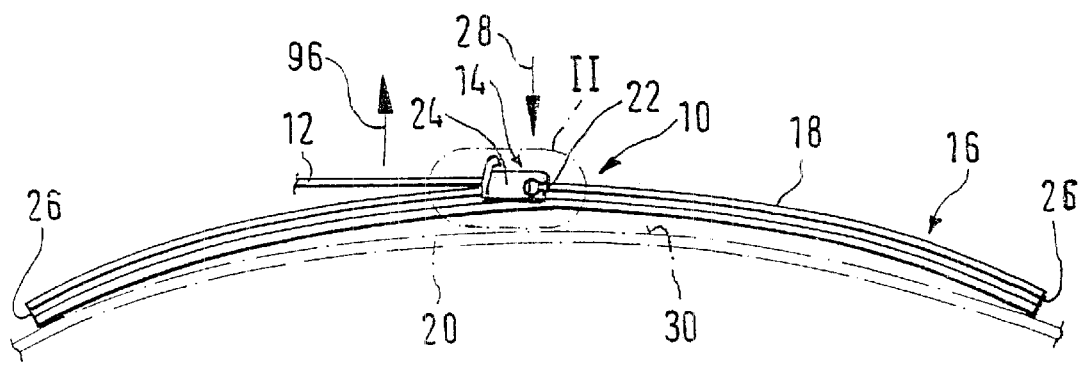
FIG. 1 is a side view of a wiper apparatus with a wiper blade and a wiper arm.

A wiper apparatus 10 shown in FIG. 1 has a driven wiper arm 12 that can be moved between two reversal points, whose free end is detachably connected to a wiper blade 16 by means of a connecting device 14. The wiper blade 16 has a band-like, elongated, spring elastic support element 18 and the wiper blade part 22 of the connecting device 14 is disposed on the band surface of this support element 18 oriented away from the window 20 to be wiped, in the middle section of the wiper blade. The other wiper arm part 24 of the connecting device 14 is connected to the free end of the wiper arm 12. An elongated, rubber elastic wiper strip 26 is disposed parallel to the longitudinal axis, on the lower band surface of the support element 18 oriented toward the window. The wiper arm 12 is loaded in the direction of the arrow 28 toward the window 20 whose surface to be wiped is indicated in FIG. 1 by means of a dot-and-dash line 30. Since the dot-and-dash line 30 is intended to represent the sharpest curvature of the window surface, it is clear that the curvature of the wiper blade 16 which is placed with only its two tips against the window, is sharper than the maximal window curvature. With the pressure (arrow 28), the wiper blade 16 rests with a wiper lip 27 of its wiper strip 26 against the window surface 30 over its entire length. As a result, a tension is produced in the band-like, spring elastic support element 18, which ensures a proper contact of the wiper strip 26 and the wiper lip 27 against the motor vehicle window 20 over their entire length. Because the window 20, which as a rule is spherically curved, does not represent a section of a sphere, the wiper blade 16 must be able to continuously adapt in relation to the wiper arm 12 to the shape of the window surface 30 during its wiping motion that extends lateral to the longitudinal span of the wiper blade. As a result, the connecting device 14 is simultaneously embodied as hinge joint between the wiper blade 16 and the wiper arm 12. The axis 32 of this hinge joint extends essentially in the wiping direction so that the wiper blade 16 can execute a pivoting movement in relation to the wiper arm 12 in accordance with the double arrow 34 in FIG. 2, which always assures the necessary contact of the wiper blade 16 with the window surface 30 over its entire length.

Figure 3:
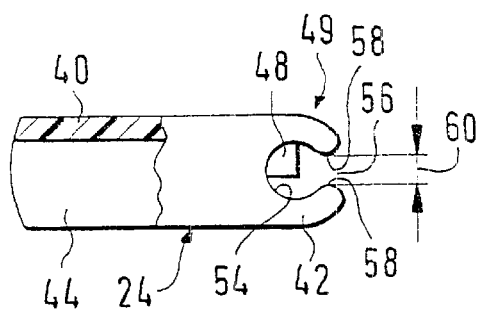
FIG. 3 is a reduced-scale depiction of the wiper arm part of the connecting device in a side view according to FIG. 2, wherein the sectional course follows the line III—III in FIG. 5.
Figure 4:
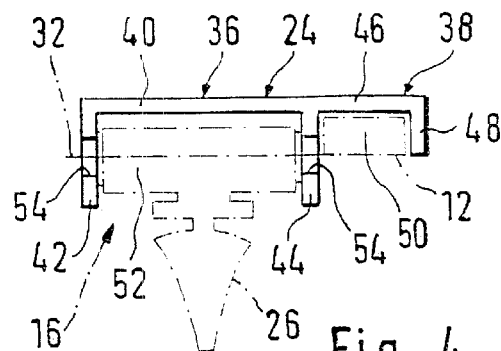
FIG. 4 shows a front view of the apparatus part according to FIG. 3, in which the cross sections of the wiper blade and wiper arm are shown with dot-and-dash lines.
Figure 5:
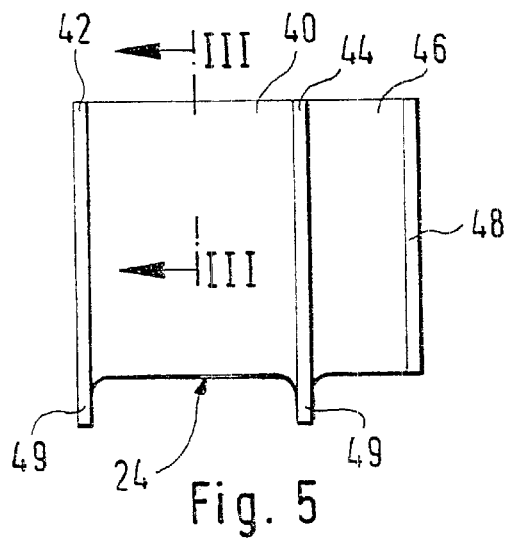
FIG. 5 shows a bottom view of the wiper blade part of the connecting device according to FIG. 4.
Figure 6:
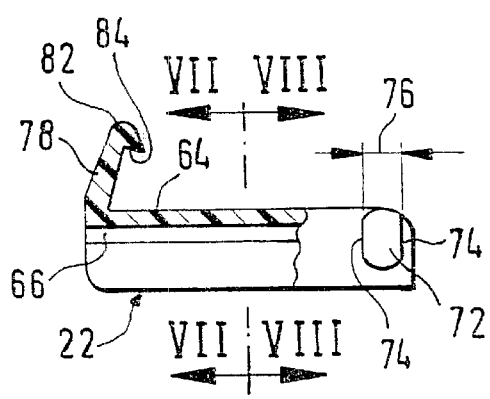
FIG. 6 is a reduced-scale view of the wiper blade part of the connecting device according to FIG. 2, wherein the sectional course follows the line VI—VI in FIG. 9.

The particular embodiment of the connecting device 14, which is also referred to as a connecting coupling, will be discussed in more detail below. The design of the wiper arm component or coupling part 24 can be seen in FIGS. 3 to 5. FIG. 4 shows that the coupling part 24 has a region 36 with a U-shaped cross section which transitions laterally into a further L-shaped region 38. The U-shaped region 36 consequently has a plate-like U-base 40, which transitions into two U-legs 42, 44 that are disposed spaced apart from and parallel to each other. The U-base 40 continues beyond the U-leg 44 and consequently constitutes the one leg 46 of the L-shape, which then transitions, spaced apart from the U-leg 44, into the other L-leg 48, which in its longitudinal span is disposed essentially parallel to the course of the U-legs 42 and 44. The L-shaped region 38 of the coupling part 24, together with the U-leg 44, thus forms a channel 50 which serves to receive the free end of the wiper arm 12. Between the two U-legs 42 and 44, there is also a receiving channel 52 for the wiper blade 16, which also includes the wiper blade coupling part 22. In FIG. 4, the cross sectional contours of the wiper arm 12 and the wiper blade 16 are shown with dot-and-dash lines. It is clear from this Fig. that the wiper blade 16 is disposed next to the wiper arm 12, viewed in the direction of the pivot axis 32. It is also clear, particularly in FIG. 5, that the two U-legs 42 and 44 extend with an extension 49 beyond the U-base 40 and also beyond the one L-leg 46. In this region 49, these two legs are each provided with a lateral bore 54 and the bore axes of these lateral bores 54 are aligned with each other (FIG. 4). The two lateral bores 54 are each open at the edge by means of an installation channel 56 (FIG. 3). The two channel walls 58 are spaced apart from each other at a distance 60 which is smaller than the diameter of the two lateral bores 54 and consequently form a narrow point in the installation channel 56, which leads to the lateral bores 54 or recesses 54.

Figure 7:
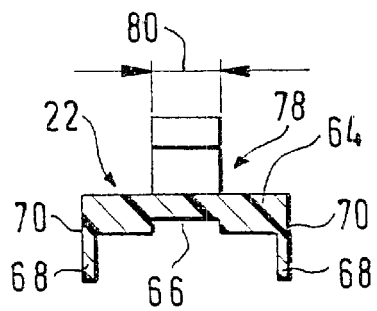
FIG. 7 is a section along the line VII—VII though the part according to FIG. 6.
Figure 8:
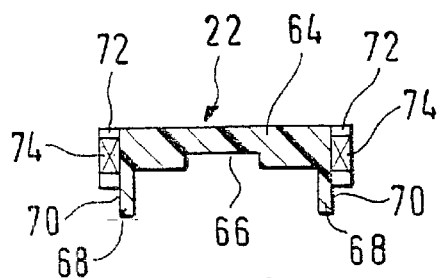
FIG. 8 is a section along the line VIII—VIII through the part according to FIG. 6.
Figure 9:
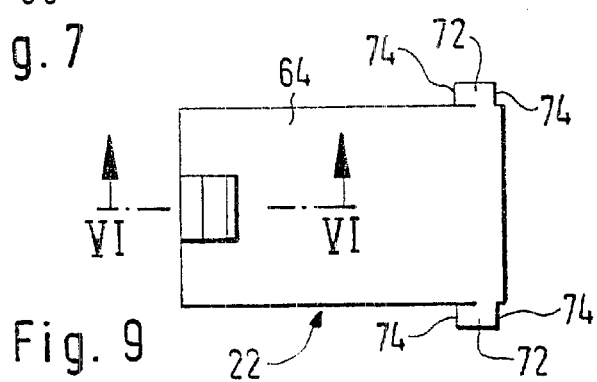
FIG. 9 is a top view of the part according to FIG. 6.

The design and embodiment of the wiper blade coupling part 22 will be discussed below in conjunction with FIGS. 6 to 9. As shown in particular by FIGS. 7 and 8, the wiper blade coupling part 22 is a component which likewise has an essentially U-shaped cross section. Its U-base plate 64 is embodied as comparatively thick and is provided on its inside with a longitudinal groove 66, which can be used to receive particular embodiment forms of the wiper strip 26 and/or the support element 18. The two U-wall legs 68 are embodied as relatively thin and are primarily used to laterally guide the support element 18 and the wiper strip 26 that it supports. The distances of the respective outsides of the two U-wall legs 68 from each other is matched to the distance between the opposing insides of the U-legs 42 and 44 of the wiper arm coupling part 24 so that a smooth, low-play movement of the wiper blade 16—which naturally includes the wiper blade coupling part 22—on the wiper arm 12 or its coupling part 24 is assured. A protruding bearing pin 72 is disposed on the two mutually remote outsides 70 of the two U-wall legs 68 and the U-base plate 64. The longitudinal axes of the two bearing pins 72 are aligned with each other. They constitute the pivot axis 32 around which the coupling part 22 and the wiper blade 16 can pivot in relation to the wiper arm 12 in the direction of the double arrow 34 (FIG. 2) when the bearing pins 72 rest in the associated lateral bores or bearing bores 54 of the wiper arm coupling part 24. In order to achieve this, the two bearing pins 72 are embodied as noncircular in cross section. To that end, they have two flattenings 74 disposed parallel to each other, wherein the distance 76 between the two flattenings 74 of a bearing pin 72 is dimensioned so that these bearing pins 72 can be inserted into the bearing bores 54 by means of the installation channels 56 of these bores when the wiper blade coupling part 22 or the entire wiper blade 16 is correspondingly rotated in relation to the wiper arm 12—which naturally also includes the coupling part 24. On the outside of the U-base plate 64 remote from the longitudinal groove 66, the wiper blade coupling part 22 is provided with a tab-like protrusion 78, which is of one piece with the wiper blade coupling part 22, which is made of an elastic plastic. In the exemplary embodiment, the width 80 of the protrusion 78 is less than the width of the coupling part 22 measured from the two outsides 70 (FIG. 7). At the free end of the protrusion 78, it is provided with a hook-like overhang 82 (FIG. 6) whose hook surface 84 oriented essentially toward the U-base plate 64 is at least approximately oriented toward the axes 32 of the two bearing pins 72.

Figure 2:
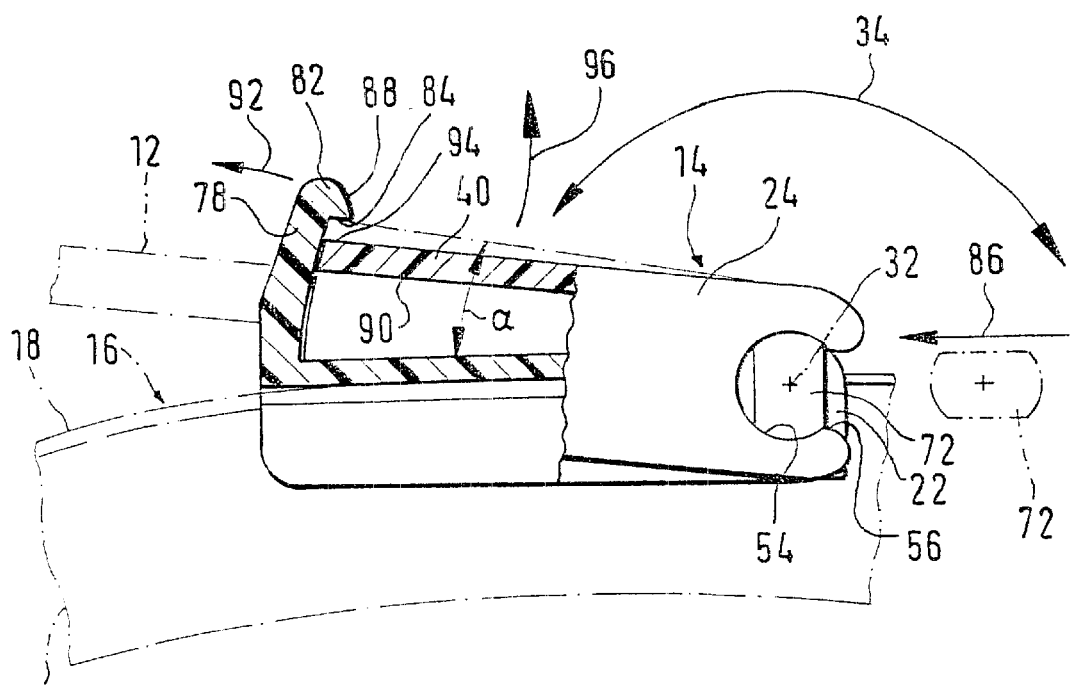
FIG. 2 is an enlarged view of a detail labeled II in FIG. 1, in which a device for connecting the wiper blade to the wiper arm is partially cut away.

The assembly of the wiper apparatus parts 12 and 16 as well as their function will now be described in conjunction with FIG. 2. The wiper blade 16 is first brought into a position in relation to the wiper arm 12, which is folded back away from the window in the direction of the arrow 96, so that its bearing pins 72 assume the position shown with dot-and-dash lines in FIG. 2 in relation to the wiper arm and its coupling part 24. Then, the wiper blade is moved in the direction of the arrow 86 so that its bearing pins 72 can travel through the installation channel 56 of the coupling part 24. Then, the wiper blade 16 is rotated in relation to the wiper arm 12 so that it assumes its operating position shown with dot-and-dash lines in FIG. 2, in which the bearing pins 72—which now constitute the hinge pins of the pivot hinge-can no longer come out of their pivot hinge bearing bores 54. During this rotating motion of the wiper blade, which is similar to the pivoting motion, the overhang 82 of the protrusion 78 strikes with an insertion bevel 88 against the inside 90 of the U-base 40 of the coupling part 24 so that a force component is produced which temporarily deflects the elastically deflectable protrusion 78 in the direction of the arrow 92 until the hook surface 84 of the overhang 82 is disposed opposite from the outside 94 of the U-base 40 of the coupling part 24 (FIG. 2). In this position, the protrusion 78 automatically springs back into its initial position counter to the direction of the arrow 92, engages behind the outside 94, and secures the wiper blade 16 to the wiper arm 12 preventing it from unintentional detachment because the length of the protrusion to the hook surface 84 only permits a rotation of the wiper blade in relation to the wiper arm by an angle α of approximately 15°, but detachment requires a rotation of approximately 90°. The determination of the angle α is made on a case-by-case basis in order to permit the amount of pivoting motion (arrow 34) required for proper cleaning of the window. In order to limit the pivoting motion, a particular embodiment is only required on one side, since the other limit is produced by the wiper blade and the wiper arm and by the parts 22 and 24 respectively connected to them. When the installed wiper blade 16 is to be removed from the wiper arm 12, the protrusion 78 must be manually deflected in the direction of the arrow 92 until the overhang 82 of the protrusion 78, which engages with its hook surface 84 behind the counterpart shoulder 94 on the outside of the U-base 40, permits a corresponding rotation of the wiper blade 16 in relation to the wiper arm 12 and the bearing pins 72 reach the position shown with dot-and-dash lines in FIG. 2, in which the wiper blade can be detached from the wiper arm counter to the direction of the arrow 86.

As FIGS. 1 and 2 show, starting from the pivot axis 32, the openings of the bearing bores that constitute the respective installation channels 56 are aligned essentially parallel to the window 20 to be wiped. In order to install the wiper blade 16 on the wiper arm 12 or to remove the wiper blade from the wiper arm, it is therefore necessary for the wiper arm to be brought lateral to the wiping direction, out of its operating position into an installation position.

The wiper blade 16 is therefore provided with an elastically deflectable, tab-like protrusion 78, which extends at least approximately in the pivot direction (double arrow 34), whose free end has a stop shoulder 84 (hook surface) disposed on it which, when the wiper blade is installed, engages behind a counterpart shoulder 94 disposed on the wiper arm 12 (outside of the U-base 40) in such a way that the stop shoulder and the counterpart shoulder constitute the means for limiting the pivot motion (double arrow 34).

What is claimed is:

1. A wiper apparatus (10) for motor vehicle windows (20), having a wiper arm (12), that can be moved between reversal positions in a wiping direction, is loaded toward the window (20), and whose free end is connected to an elongated wiper blade (16), which can pivot on a pivot hinge around an axis (32) pointing in the wiping direction, and together with the wiper arm, can be moved lateral to the wiping direction, from its operating position into an installation position, having two bearing pins (72), which are part of the pivot hinge, protrude from longitudinal sides of the wiper blade (16), are aligned with each other, are noncircular in transverse cross section, and are guided in recesses (54) of the wiper arm that are open at an edge, and having means for limiting the pivoting motion (double arrow 34), characterized in that the wiper blade (16) is provided with an elastically deflectable, tab-like protrusion (78), which extends at least approximately in the pivot direction (double arrow 34) and has a stop shoulder (84) disposed at its free end which, when the wiper blade is installed, engages behind a counterpart shoulder (94) on the wiper arm in such a way that the stop shoulder (84) and the counterpart shoulder (94) constitute the limitation means.

2. The wiper apparatus according to claim 1, characterized in that the bearing pins (72) are disposed on a component (22), which is made of an elastic plastic and is associated with the wiper blade (16), and in that the protrusion (78) is of one piece with this component.

3. The wiper apparatus according to claim 2, characterized in that the stop shoulder (84) is embodied on an overhang (82) of the protrusion (78) which is at least approximately oriented toward the pivot axis (32).

4. The wiper apparatus according to claim 1, characterized in that the counterpart shoulder (94) of the wiper arm (12) is disposed on a component (24), which is situated at the free end of the wiper arm (12) and has the bearing recesses (54) that are part of the pivot hinge.

5. The wiper apparatus according to claim 1, characterized in that starting from the pivot axis (32), the openings (52) of the bearing recesses (54) are disposed essentially parallel to the window (20) to be wiped.

6. The wiper apparatus according to claim 1, characterized in that the wiper blade (16) is disposed next to the wiper arm (12), viewed in the direction of the pivot axis (32).

7. The wiper apparatus according to claim 2, characterized in that the component (22) associated with the wiper blade (16) is disposed in a middle section of a band-like, elongated support (18), whose one band surface has an elongated wiper element (26) attached to it, which can be placed against the window (20).

* * * * *